(12) United States Patent
Garver

(10) Patent No.: US 7,114,656 B1
(45) Date of Patent: Oct. 3, 2006

(54) FIXED SELF-CHECKOUT STATION WITH CRADLE FOR COMMUNICATING WITH PORTABLE SELF-SCANNING UNITS

(75) Inventor: Roy A. Garver, Eugene, OR (US)

(73) Assignee: ECR Software Corporation, Boone, NC (US)

( * ) Notice: Subject to any disclaimer, the term of this patent is extended or adjusted under 35 U.S.C. 154(b) by 0 days.

(21) Appl. No.: 09/492,668

(22) Filed: Jan. 27, 2000

(51) Int. Cl.
 *G06K 7/10* (2006.01)
(52) U.S. Cl. ............... 235/462.46; 235/378; 235/383; 705/21; 705/26
(58) Field of Classification Search ........... 235/462.46, 235/462.45, 462.44, 378, 383
 See application file for complete search history.

(56) References Cited

U.S. PATENT DOCUMENTS

| | | | |
|---|---|---|---|
| 4,929,819 A | | 5/1990 | Collins, Jr. |
| 5,198,644 A * | | 3/1993 | Pfeiffer et al. ............... 235/383 |
| 5,345,071 A | | 9/1994 | Dumont |
| 5,424,524 A | | 6/1995 | Ruppert et al. |
| 5,426,282 A * | | 6/1995 | Humble ....................... 235/383 |
| 5,457,307 A * | | 10/1995 | Dumont ....................... 235/383 |
| 5,489,773 A * | | 2/1996 | Kumar ......................... 235/462 |
| 5,540,301 A * | | 7/1996 | Dumont .................. 235/383 X |
| 5,595,264 A | | 1/1997 | Trotta |
| 5,640,002 A * | | 6/1997 | Ruppert et al. ......... 235/462.46 |
| 5,641,039 A * | | 6/1997 | Dumont ....................... 186/61 |
| 5,804,807 A * | | 9/1998 | Murrah et al. ............... 235/383 |
| 5,825,002 A * | | 10/1998 | Roslak ........................ 235/375 |
| 5,923,735 A | | 7/1999 | Swartz et al. |
| 5,952,642 A * | | 9/1999 | Lutz ........................... 235/383 |
| 5,992,570 A * | | 11/1999 | Walter et al. ................. 186/36 |
| 6,092,725 A * | | 7/2000 | Swartz et al. ............... 235/383 |
| 6,179,206 B1 * | | 1/2001 | Matsumori .................. 235/383 |
| 6,182,053 B1 * | | 1/2001 | Rauber et al. ................. 705/28 |
| 6,189,789 B1 * | | 2/2001 | Levine et al. ................ 235/383 |
| 6,199,753 B1 * | | 3/2001 | Tracy et al. .................. 235/375 |
| 6,243,447 B1 * | | 6/2001 | Swartz et al. ............. 379/93.12 |
| 6,394,355 B1 * | | 5/2002 | Schlieffers et al. ..... 235/472.01 |
| 6,550,672 B1 * | | 4/2003 | Tracy et al. ................. 235/383 |
| 6,732,933 B1 * | | 5/2004 | Waxelbaum ........... 235/462.25 |
| 6,761,316 B1 * | | 7/2004 | Bridgelall et al. ...... 235/462.46 |
| 2001/0014870 A1 * | | 8/2001 | Saito et al. .................... 705/14 |
| 2001/0015375 A1 * | | 8/2001 | Swartz et al. ............... 235/383 |
| 2002/0050526 A1 * | | 5/2002 | Swartz et al. ........... 235/472.02 |
| 2002/0104887 A1 * | | 8/2002 | Schlieffers et al. ..... 235/472.02 |
| 2003/0015585 A1 * | | 1/2003 | Wike et al. .................. 235/383 |

(Continued)

FOREIGN PATENT DOCUMENTS

EP  0 390 448 A1  3/1990

(Continued)

OTHER PUBLICATIONS

PSC Manufactures First U-Scan® Express Self-Checkout System Installed in Utah, 1999, Two pages.

(Continued)

*Primary Examiner*—Daniel Walsh
(74) *Attorney, Agent, or Firm*—MacCord Mason PLLC

(57) ABSTRACT

A retail checkout system includes a customer-operated portable terminal with a data reader, such as a barcode scanner, and a customer-operated self-checkout station with an automated payment-accepting subsystem. Customers use the portable terminal to identify and log products that are selected as they move through a store. Item identification data is then transferred to the self-checkout station, where the customer pays for the selected products using the automated payment-accepting subsystem.

8 Claims, 7 Drawing Sheets

U.S. PATENT DOCUMENTS

2003/0071126 A1\* 4/2003 Waxelbaum ............ 235/462.25
2003/0195818 A1\* 10/2003 Howell et al. ................. 705/26

FOREIGN PATENT DOCUMENTS

| EP | 0 654 477 A2 | | 5/1995 |
|---|---|---|---|
| EP | 0 924 669 A2 | | 6/1999 |
| JP | 407234972 A | \* | 9/1995 |
| WO | WO 96/26505 | | 8/1996 |
| WO | WO 98/44462 | | 10/2001 |

OTHER PUBLICATIONS

Information re CSE Scanboy obtained from Internet on Jul. 7, 1999, Twelve pages.
U-Scan Express Self-Checkout System, PSC Inc., 1998, Four pages.
Information re CSE Scanboy obtained from Visum web site on Oct. 27, 1999, Thirteen pages.
Portable Shopping System™, Symbol Technologies, Inc., 1997, Four pages.

\* cited by examiner

FIXED SELF-CHECKOUT STATION WITH CRADLE FOR COMMUNICATING WITH PORTABLE SELF-SCANNING UNITS

BACKGROUND OF THE INVENTION

The field of the present invention relates to self-checkout systems for retail establishments or more particularly to a data reading system that enables customers to identify and log selected products by themselves using a portable reading terminal, and to pay for those products by themselves using a self-checkout station that includes a payment-accepting subsystem. In a preferred embodiment, the selected products are identified and logged using a portable terminal to read barcodes printed on the products.

In conventional supermarkets, product selection is performed by the customers, and product checkout is performed by cashiers. Typically, a customer will walk up and down the aisles selecting products to buy and placing the selected products in the shopping basket. Once the customer has finished selecting products, the basket is taken over to a checkout counter. The customer then unloads the selected products from the basket and places them on the checkout counter. Each item is then checked out by a cashier, typically using a barcode scanning system. Finally, each item is bagged, either by the customer, the cashier, or by another supermarket employee.

In this conventional shopping approach, the product selection process and the checkout process are performed serially (i.e., one after the other). As a result, the total time required to complete a shopping trip is the sum of the product selection time and the checkout time. Even under optimum conditions, when there are no queues at the checkout counters and the cashier operates quickly and efficiently, the checkout process can contribute a few minutes to the total shopping time. And when conditions are sub-optimum, (e.g., when there are long checkout queues, when a cashier is slow, and/or when a preceding customer has a problem) the checkout process can significantly extend the total shopping time.

Adding self-checkout stations to conventional checkout stations can reduce checkout queue times without requiring additional manpower, because the customers will be distributed in a larger number of shorter queues. One example of this type of self-checkout system is the U-Scan® Express self-checkout system available from PSC Inc., Webster, N.Y. 14580. With the U-Scan® system, customers scan their selected products by themselves, and then pay for their purchase by themselves using either an automatic cash-receiving system or a magnetic credit/debit card reader.

While using the U-Scan® system does reduce the time spent waiting in queues for checkout by shortening the queues, product selection and checkout are still performed serially.

Another checkout system is the Scanboy™ system, originating from CSE GmbH, Germany. With the Scanboy™ system, upon entering the store, each customer picks up a portable, cordless scanning unit from a dispenser rack and uses this scanning unit to scan the selected products as they are placed in a shopping cart. When the customer has finished selecting products, the customer returns the handheld scanner to the rack. The rack then prints out a receipt for the items that were scanned by the handheld unit. The customer then takes this receipt to a human cashier, who accepts payment for the purchase.

While portable scanners such as the Scanboy™ system can cut total shopping time by reducing the amount of time spent at checkout, portable scanner users may still have to wait in a queue for the human cashier to pay for their purchase. And although the time required to process each customer should be smaller than at conventional scanning checkout stations, the queue time can still be considerable, particularly when a preceding customer has a special problem that requires the cashier's attention.

SUMMARY OF THE INVENTION

The present invention relates to a system that includes a customer-operated portable terminal and a customer-operated self-checkout station with an automated payment-accepting subsystem. Customers use the portable terminal to identify and log products that they select as they walk through a store. Product identification data is then transferred to the self-checkout station, where the customer pays for the selected products using the automated payment-accepting subsystem. In a preferred embodiment, the portable terminal identifies the selected products by reading barcodes that have been printed on the products.

DETAILED DESCRIPTION OF THE PREFERRED EMBODIMENTS

Figure 1A:
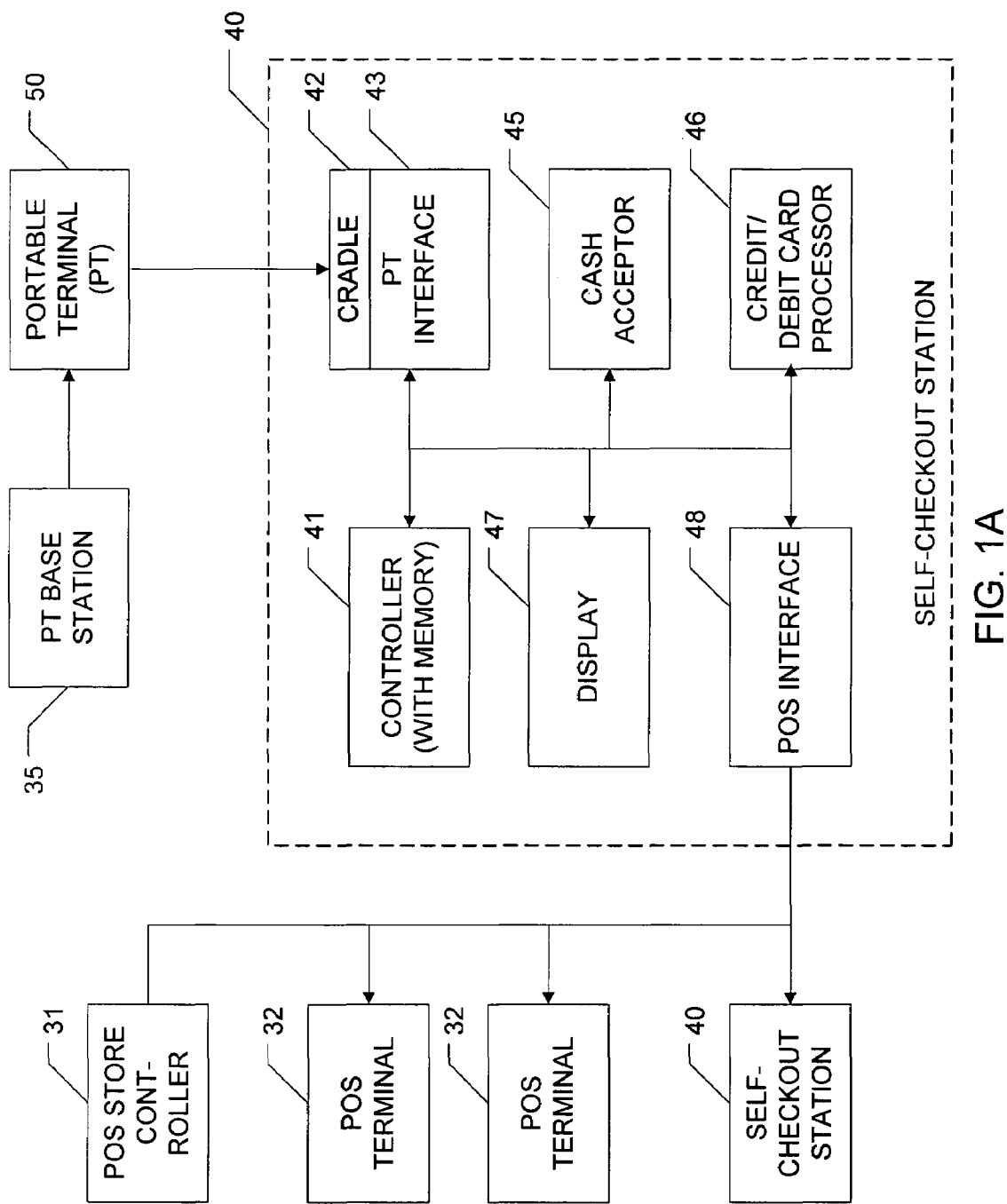
FIG. 1A is a block diagram of a preferred embodiment barcode reading and checkout system.
Figure 1B:
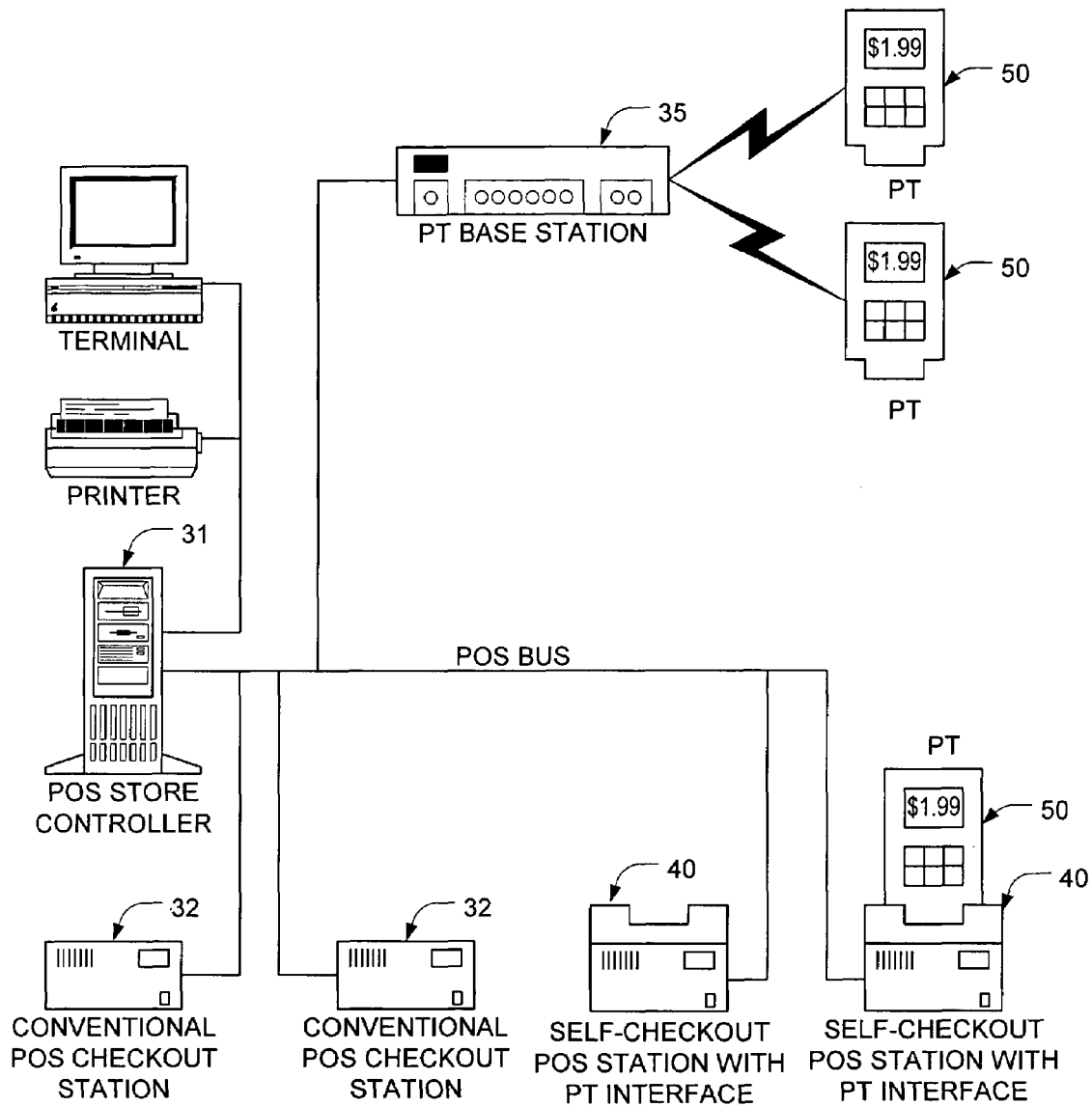
FIG. 1B is a schematic illustration of the barcode reading and checkout system of FIG. 1A.

FIGS. 1A and 1B are, respectively, a block diagram and a schematic diagram of a preferred embodiment point-of-sale (POS) store checkout system. The illustrated system includes a POS store controller 31, a pair of POS terminals 32, and a pair of self-checkout stations 40. Alternative embodiments may be implemented using a different quantity of POS terminals 32, or without any POS terminals. A different quantity of self-checkout stations 40 may also be used, provided that at least one self-checkout station 40 is included.

The POS store controller 31 and the POS terminals 32 are conventional in the field of POS systems, as are the interconnection protocols between those devices. Conventional POS terminals are checkout counters operated by store clerks. The self-checkout stations 40 are preferably designed to mimic the operation of such conventional POS terminals when communicating with the POS store controller 31. By implementing this type of mimicking, self-checkout stations 40 can be added to pre-existing POS installations without requiring modifications to the POS store controller 31 in those installations.

The embodiment illustrated in FIGS. 1A and 1B also includes at least one portable terminal (PT) 50 that can communicate with the self-checkout station 40. Preferably, each PT 50 is stored in a PT base station 35 when the PT 50 is not being used. The operation of the PT 50 is described in greater detail below.

An overview of the FIG. 1A/1B embodiment will first be described from the perspective of a customer in a retail store. Of course, this embodiment may be applied to alternative contexts as well. After entering into the store, the user locates the PT base station 35 (which stores the PTs 50 when they are not being used) and removes a PT 50 from the PT base station 35. Preferably, the PT 50 is cordless and comprises either a scanning system or an optical imaging system for reading barcodes. Alternatively, the PT 50 may comprise another type of data reader for identifying products, such as an optical recognition system that recognizes characters (or other non-barcode symbols) printed on the products, an image comparison system that identifies the products by their overall appearance, or a radio frequency identification (RFID) system that reads an ID tag affixed to each product. The customer may either hold the PT 50 in their hand, or attach the PT to a shopping cart using any appropriate secure and removable attachment mechanism.

The customer then traverses the various aisles of the store and selects the desired items in any conventional manner. Each time the user selects an item, the PT 50 is employed to identify the item. In embodiments that use a barcode reader to identify the products, this identification is preferably accomplished by reading a barcode printed on each selected item. In alternative embodiments, symbols or images of the product are read and identified in any suitable manner.

The item identification operation may be initiated by, for example, pressing a button on the PT 50 or using a proximity sensor (not shown) to detect an item's presence. This item identification operation may be performed either before or after each selected item is placed in the shopping cart, in accordance with each customer's preference. As each item is identified, the PT 50 stores information about the identified item in an internal list. The steps of selecting the items and identifying the items (by, for example, reading the barcodes affixed on the items) are repeated until the customer has selected the last desired item and has used the PT 50 to identify it.

After finishing the item-selecting and item-identifying process, the user takes the shopping cart over to the self-checkout station 40, and places the PT 50 into a cradle 42 in the self-checkout station (SCS) 40. The PT 50 then transfers the list of read items to the self-checkout station 40 and the SCS 40 displays a total price for the selected items. The user then tenders payment at the SCS 40 using, for example, a credit/debit card processing device 46 or a cash-accepting device 45.

In one preferred embodiment, the PTs 50 operate in "batch" mode. In the batch mode, each PT 50 has an internal price look-up table (PLU) that is accessed to determine the price of each identified item. Preferably, this PLU is updated automatically each time the PT 50 is returned to the base station 35. Alternatively, updating of the PLU may be initiated manually by, for example, connecting the PT 50 to a dedicated fixture (not shown) on a regular basis (e.g., once a day). As yet another alternative, the PT 50 may obtain the PLU table from the base station 35 using a suitable remote data link such as a radio frequency (RF) or an infrared optical communication link. The PLU table may be so obtained at either regular intervals (e.g., once an hour) or at non-regular intervals (e.g., every time the price list for the store is updated).

In another preferred embodiment, the PTs 50 operate in "real-time" mode. In this mode, each PT obtains the price for each identified item from the base station 35 in real time using any suitable data communication link including, for example, a radio frequency (RF) or an infrared optical data communication link.

In another preferred embodiment based on a real-time connection between the PT 50 and the base station 35, the PT acts as a "dumb" reading terminal, and merely forwards the identity of each read item to the base station 35. The base station 35 then stores the list of read items (instead of relying on the PT 50 to store that list). When the PT 50 is eventually placed in the cradle 42 in the SCS 40, the base station 35 transfers the list of items corresponding to a particular PT 50 to the SCS 40.

The hardware configuration shown in FIGS. 1A and 1B includes at least one SCS 40 connected to a POS system that includes a POS store controller 31 and, optionally, conventional POS terminals 32. Each SCS 40 includes a controller 41, with associated memory, that runs a control program (as described below) and a suitable display 47 for displaying messages to the user. Each SCS 40 also includes a POS interface 48, a cash acceptor 45 (e.g., of the type commonly found in vending machines that accept paper money), and a credit/debit card processor 46 (e.g., of the type commonly found at self service pay-at-the-pump gasoline filling stations). Preferably, each of the subsystems 45–48 operates under control of the controller 41, and all communications between the SCS 40 and the POS store controller 31 occur in the same way that conventional POS terminals 32 communicate with the POS store controller 31.

The SCS 40 also includes a PT interface 43, which preferably includes a suitable docking cradle 42 designed to interface with the PT 50. The PT interface 43 may be implemented using any suitable interfacing technique including, for example, electrical contact connections using the RS232 or USB standards, and cordless connections using the IRDA infrared standard. Preferably, the PT interface 43 also operates under control of the controller 41 so that when the PT 50 is docked in the docking cradle 42, the SCS 40 can receive data from the PT 50. Optionally, the PT interface 43 may be bidirectional.

Preferably, the PT interface 43 includes hardware (not shown) that automatically recognizes when a PT 50 has been docked in the cradle 42. This automatic recognition can be accomplished using any suitable technique including, for example, using a micro switch (not shown) that is actuated whenever a PT 50 is inserted into the cradle 42, using a light source and photo detector pair, or by detecting the completion of a circuit established by contacts provided on the PT 50. Alternatively, the SCS 40 may rely on an indication made by the customer (e.g., by actuating a switch) to inform the SCS 40 that a PT 50 has been connected to the cradle 42.

Figure 2A:
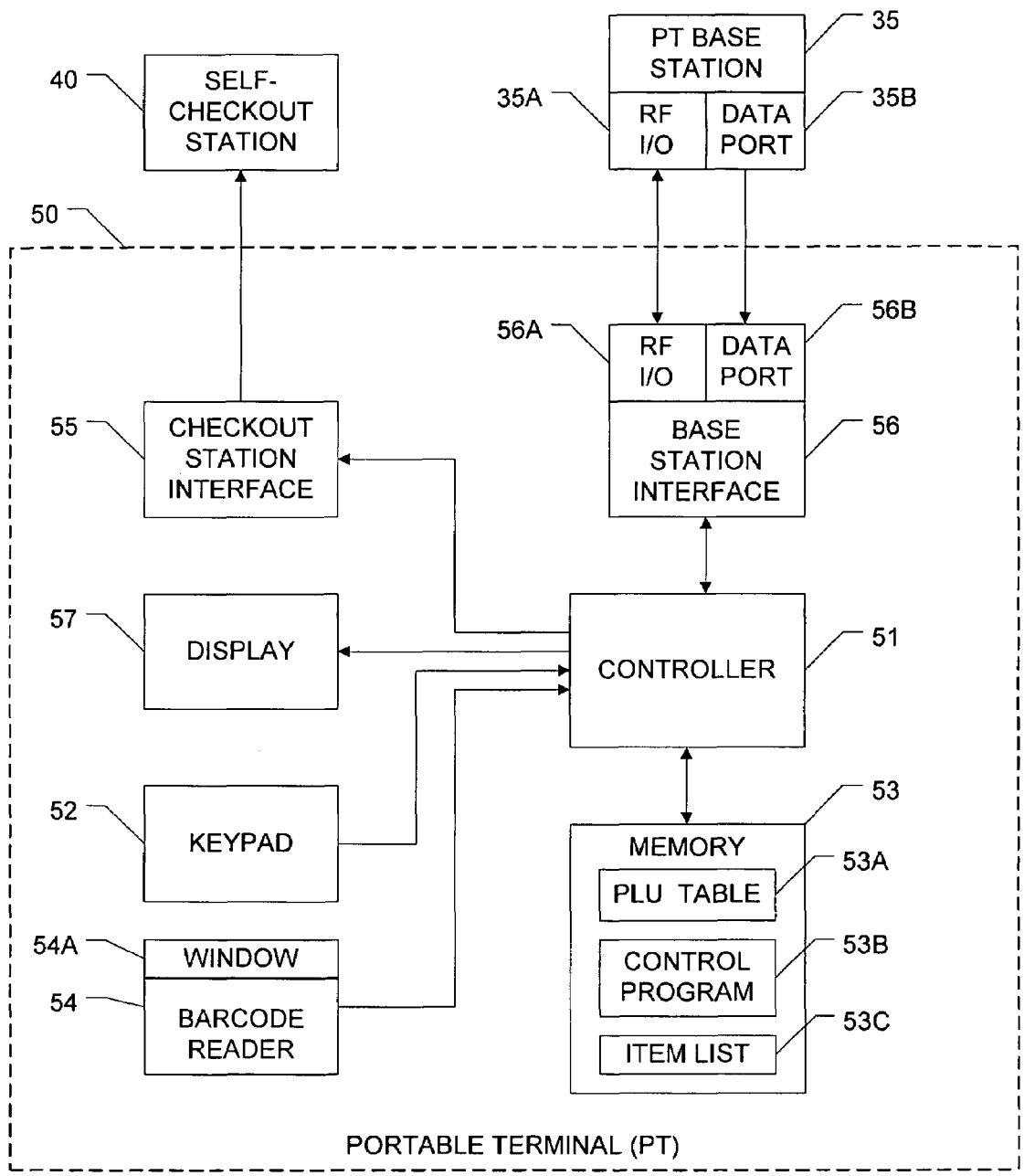
FIG. 2A is a block diagram that shows details of the portable terminal shown in FIG. 1A.
Figure 2B:
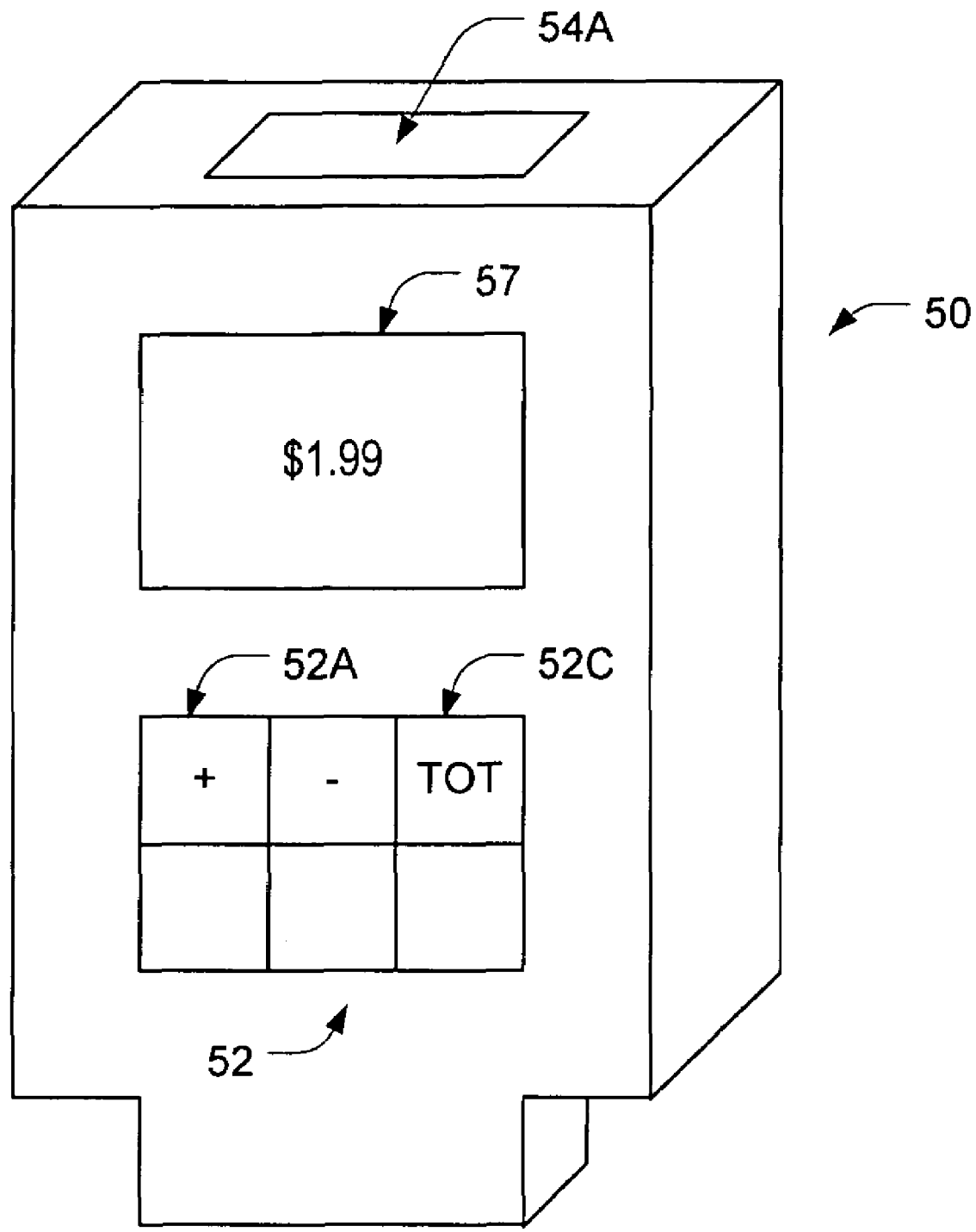
FIG. 2B is a schematic illustration of the portable terminal of FIG. 2A.

FIGS. 2A and 2B are, respectively, a block diagram and a pictorial representation of a preferred portable terminal (PT) 50. The illustrated PT 50 includes a controller 51, a keypad 52, a memory 53, a barcode reader 54, a checkout station interface 55, a base station interface 56 and a display 57. Preferably, the controller 51 includes a microprocessor or a microcontroller that controls all operations of the PT 50 by executing a control program 53B stored in the memory 53. The control program 53B may be stored in nonvolatile portion of the memory 53 (e.g., ROM). Alternatively, the control program 53B may be stored in a writable portion of the memory 53 (e.g., RAM) that is updated from an external data source (e.g., the PT base station 35, via the base station interface 56). The memory 53 also includes a writable data storage region 53C (e.g., RAM) that can be accessed by the controller 51. While the memory 53 is illustrated as being separate from the controller 51, the memory and the controller may instead be implemented together in a single integrated circuit.

The customer uses the keypad 52 to control the operation of the device. Keystrokes on keypad 52 are detected by the controller 51 using any suitable techniques including, for example, generating an interrupt each time a key is pressed or using a dedicated keyboard interface circuit (not shown) to strobe the keyboard and to store the detected keys in a buffer.

Preferably, the PT 50 uses barcode reader 54 to read barcodes on the items selected by the customer in order to identify the selected items. Barcode reading may be accomplished using any of a variety of techniques well known to those skilled in the art. For example, the barcode reader 54 may comprise a flying spot barcode scanner that reads barcodes by scanning a spot of laser light across the barcode, detecting light reflected by the target barcode, and processing and decoding the detected light. For example, the LM500 Plus™ or Minuet™ scan modules from PSC Inc. of Webster, N.Y. may be incorporated into a handheld terminal housing. Alternatively, the barcode reader 54 may comprise an optical imaging reader that operates by capturing an image of the target barcode using an image sensor (e.g., a CCD or an active pixel CMOS image sensor), and processing and decoding the detected image. Other alternative barcode readers (e.g., the Hewlett-Packard® HBSW-8000 series wand-type readers) may also be used. In the illustrated embodiment, the barcode reader provides its output to the controller 51, and is also controlled by controller 51 using appropriate control signals (not shown).

Alternatively, instead of using the illustrated barcode reader 54, the PT 50 may identify the items selected by the customer using another item-identification technique. For example, an optical imager combined with optical character recognition software could be used to identify items by reading and recognizing words or other symbols printed on each item. Alternatively, items could be identified by capturing their image and comparing each captured image to a set of pre-stored images representing the universe of items that are stocked in the store. In other alternative approaches, items may be identified using voice recognition by having the customer say the name of each selected item (e.g., "Cheerios@, 18 ounces"), or identified using an RFID system. Numerous other alternative approaches for identifying items may be readily implemented.

The PT 50 communicates with the base station 35 via the base station interface 56. For batch mode PTs 50 that only communicate with the base station 35 when the PT is docked in the base station, communication is preferably implemented using a data port 56B of the base station interface 56, and a data port 35B of the base station. These data ports 35B, 56B may be implemented using any suitable interface including, for example, wired connections using the RS232 or USB standards, and cordless infrared connections using the IRDA standard.

For PTs 50 that operate in real-time mode, where the PT 50 communicates with the base station 35 when the PT 50 is being carried around by the customer, communication is preferably implemented using a wireless link such as the RF data interfaces 56A, 35A of the base station interface 56 and the base station 35. These RF data interfaces 35A, 56A may be implemented using any suitable data communication protocol including, for example, PSK and FSK. Less preferably, alternative types of wireless communications such as an infrared data link (not shown) may be substituted for the illustrated RF link.

Real-time mode PTs 50 may use the same RF data interface 35A, 56A to communicate with the base station 35 when the PT 50 is docked in the base station 35. Alternatively, these real-time mode PTs 50 may incorporate an additional data port 56B to communicate with a corresponding data port 35B on the PT base station 35 when the PT 50 is docked in the base station 35.

The PT 50 communicates with the self-checkout station 40 via the checkout station interface 55 using any suitable interface including, for example, corded connections using the RS232 or USB standards, and cordless connections using the IRDA infrared standard. Of course, the communication protocol in the PT 50 should match the protocol used in the SCS 40 described above.

Preferably, the checkout station interface 55 includes hardware that automatically senses when the PT 50 is docked in the SCS 40, and the base station interface 56 includes hardware that automatically senses when the PT 50 is docked in the base station 35. Automatic operating-condition sensing can be accomplished using any suitable arrangement. For example, the PT 50 may be provided with a first contact (not shown) that is grounded by the base station 35 whenever the PT 50 is docked in the base station 35, and a second contact (not shown) that is grounded whenever the PT 50 is docked in the SCS 40. Alternatively, a unique predetermined identification signal may be provided by the base station 35 and the SCS 40, and circuitry to detect the provided signal (not shown) may be incorporated into the PT 40. Numerous alternative automatic operating condition-sensing approaches can be readily envisioned. Alternatively, a user-actuated mode selector (e.g., a rotary switch) may be used to inform the controller about the current operating condition.

Figure 3:
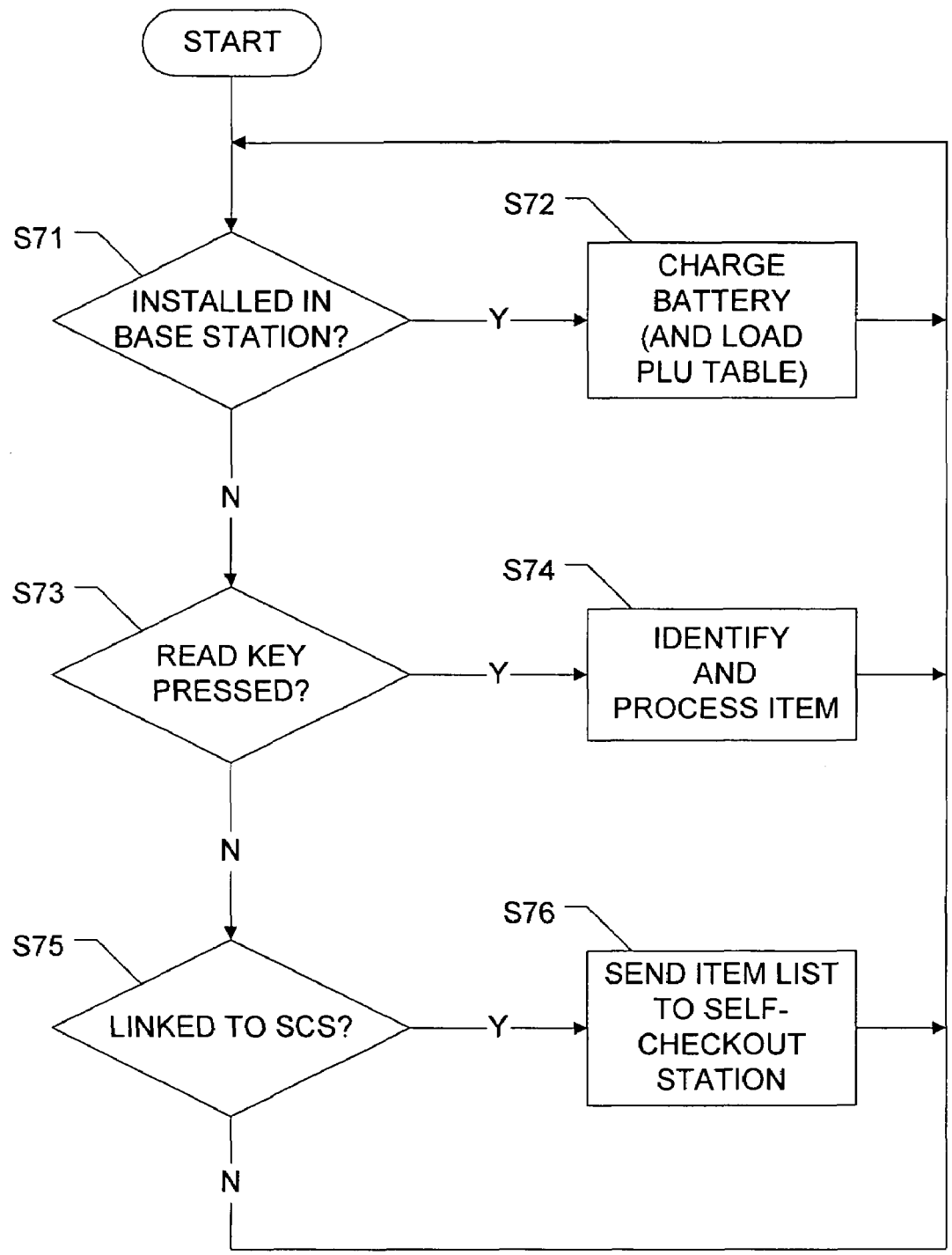
FIG. 3 is a flowchart that shows the operation of the portable terminal shown in FIG. 2A.
Figure 4:
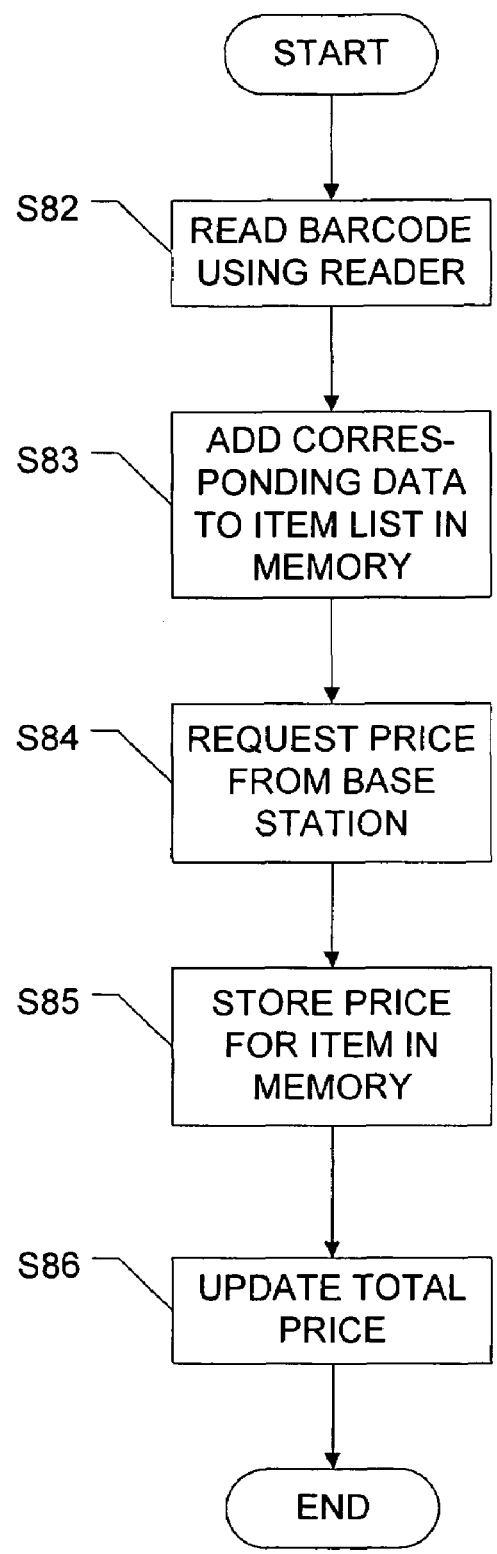
FIG. 4 is a flowchart that shows the operation of the portable terminal shown in FIG. 2A when it is being used to read barcodes.

FIGS. 3 and 4 are flowcharts that illustrate a preferred control program 53B, which is run by the controller 51 in the PT 50 (all shown in FIG. 2A). The program illustrated in FIG. 3 selects a suitable control routine for each of three possible operating conditions: (1) when the PT is docked in the base station, (2) when the PT is being used by a customer to identify items, and (3) when the PT is linked to the self-checkout station. In the illustrated embodiment, steps S71, S73, and S75 of the control program select the appropriate control routine as follows, depending on the current operating condition.

First, in step S71, the controller 51 performs a test to determine whether the PT 50 is docked in a PT base station 35, preferably using the operating-condition sensing circuitry described above. If the test indicates that the PT 50 has been so docked, program control proceeds to step S72 where a battery-charging process is initiated to charge a rechargeable battery (not shown) which preferably powers the PT 50. For PTs 50 that operate in the batch mode, a price look-up type (PLU) table may be loaded into the memory 53a of the PT 50 via the data port interface 56B, 35B when the PT is docked in the base station 35.

If the test performed in step S71 indicates that the PT 50 is not docked in a PT base station 35, processing continues at step S73, where a test is performed to determine whether the "read" key 52A on the keypad has been pressed, which will happen when the customer wishes to identify an item. If the read key 52A has been pressed, processing continues in step S74, where the handheld unit identifies the item by, for example, reading and processing the barcode. FIG. 4 is a flowchart of a preferred process performed in real-time mode PTs that rely on barcodes for identifying and processing items, and it can be best understood when viewed together with FIG. 2A.

The process of FIG. 4 will typically be initiated by the customer by pressing the "read" key 52A on the keypad 52 while the customer walks through the store selecting items to buy. Alternatively, it may be initiated by a proximity sensor (e.g., an ultrasonic distance detector) that detects when an object is close to the light entrance window 54A of the barcode reader 54. The use of a proximity sensor is particularly advantageous when the barcode reader 54 comprises an optical imaging type reader.

First, in step S82 the barcode reader 54 reads and decodes the barcode from the selected item. After the barcode reader 54 has read the barcode, the decoded data is transferred to the controller 51. Optionally, the task of decoding of the barcode may be performed by the controller 51 instead of the barcode reader 54. The decoded data will typically correspond to an item upon which the barcode is affixed. The controller 51 takes this data and, in step S83, stores it in an item list 53C in the memory 53. Of course, when symbols other than barcodes are used to perform item identification, appropriate modifications to step S82 must be made, which will be apparent to persons skilled in the art.

Next, processing continues in step S84 where the controller 51 requests a price for the item corresponding to the decoded data from the base station 35. This price request may be accomplished, for example, by sending the decoded data along with a predetermined data header to the base station 35 via the RF interface 56A of the base station interface 56. The base station 35 would look them up the price for the corresponding item on a price look-up table (not shown), and send the price back to the controller 51 via the RF interface 35A and the base station interface 56. After receiving the price, the controller 51 stores the price in the memory 53 in step S85.

Preferably, in step S86, the controller 51 uses the price information received from the base station 35 to update a running total price for all the items that have been read by the barcode reader 54. This updated total price is preferably stored in the memory 53, and is provided for the convenience of customers who wish to know the total price of the selected items in their shopping cart. Preferably, the customer can access the total price by pressing a dedicated key 52C on the keypad 52. When the controller 51 recognizes that this dedicated key 52C has been pressed, the controller will determine the total price and instruct the display 57 to display the total price.

The operation of batch mode PTs 50 is also similar to the operation of real-time PTs described above in connection with FIG. 4. Instead of requesting each price from the base station 35 in step S84, however, the batch mode PTs 50 obtain each price from a price look up (PLU) table 53A stored in the PT's internal memory 53. This PLU table 53A may be updated each time the batch-mode PT 50 is returned to the PT base station 35, as described above.

Each time the above-described process is repeated (i.e. once for each item placed in the customer's shopping cart), an entry is added to the item list 53C. The item list 53C will therefore contain an entry corresponding to each item that has been placed in the customer's cart. Optionally, the cart may be supplied with a mechanism for confirming that an item has been read properly before being placed in the cart. For example, the cart may include weight or volume sensors and the PLU data may also include weight or volume data of the items. Once an item is read, the cart would then expect the total weight or volume of the cart's contents to increase by the weight or volume of the read item. When the actual added weight or volume does not match the expected increase, a flag may be set to alert the customer or the store management. Similarly, this flag would be set if an item is placed in the cart without being read.

Returning now to FIG. 3, if the test performed in step S73 determines that the read key has not been pressed, processing continues at step S75, where the PT 50 performs a test to determine whether it has been docked to the self-checkout station 40, preferably using the operating-condition sensing circuitry described above. Docking will typically occur after the customer has finished selecting and scanning all the items that the customer wishes to buy.

If the test performed in step S75 determines that the PT 50 has been linked to an SCS 40, processing continues at step S76, where the data stored in item list 53C in the memory 53 of the PT 50 is transferred to the SCS 40 via the checkout station interface 55. The transfer of data from the PT 50 to the SCS 40 may be accomplished by implementing a suitable data transmitting algorithm at the PT 50, and a complementary receiving algorithm at the SCS 40. An example of such a suitable data transmitting algorithm for the PT 50 would be to read a single data record from the item list 53C in the memory 53, reformat the data record for transmission, and transfer the data record to the checkout station interface 55. After transmitting each data record, the controller 51 would then check the item list 53C to determine whether there are any additional data records stored therein. If there are additional data records, the next data record is read, reformatted for transmission, and sent to the checkout station interface 55. Processing continues in this manner until the last data record from the item list has been transmitted.

Figure 5:
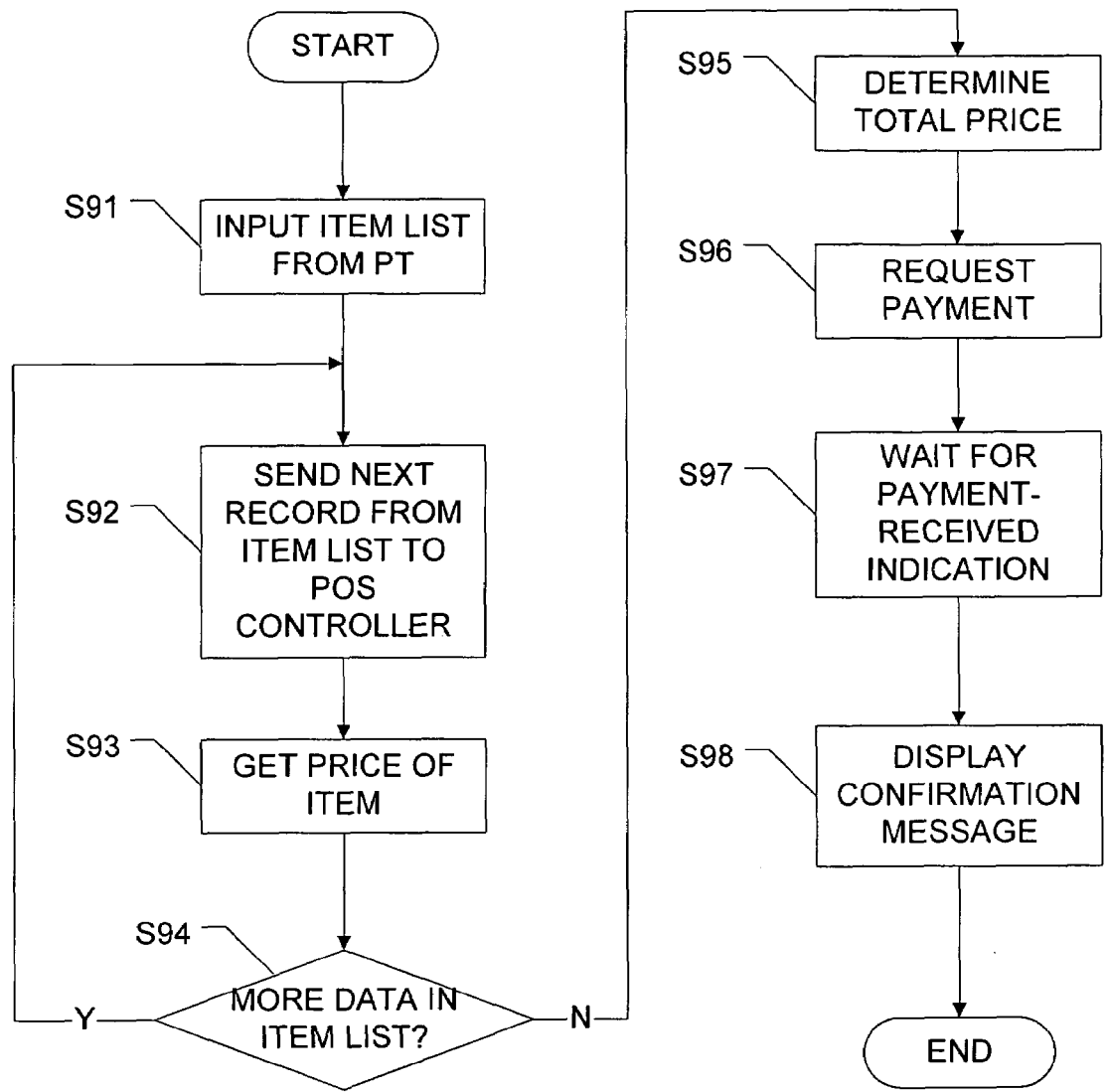
FIG. 5 is a flowchart that shows the operation of the self-checkout station shown in FIG. 1A.

Operation of the SCS 40 after a PT 50 has been docked will now be explained with reference to FIG. 1A and FIG. 5. Ordinarily, the PT 50 will only be docked in the cradle 42 in the self-checkout station 40 after the customer has completed selecting the items the customer wishes to buy and after the items have been identified using the PT 50.

First, in step S91, the SCS 40 receives the item list data records from the PT 50, which arrives via the PT interface 43. Data reception for the item list may be initiated by, for example, pressing a button on the SCS 40 or the PT 50, or by detecting when the PT 50 has been docked. Details of implementing the data reception algorithm will depend upon the particular algorithm used at the PT 50 for transmitting the data records. The received data records are stored in the memory of the controller 41 so as to reconstruct a local copy of the item list at the SCS 40.

In step S92, the controller 41 reads a data record from the local item list, and sends it to the POS interface 48. The POS interface 48 converts the data from the controller 41 into a suitable format, and forwards the data to the POS store controller 31. Preferably, the POS interface 48 formats the data so as to mimic transfers from conventional POS terminals 32 that occur when an item is scanned using a conventional POS terminal 32. When this type of mimicking is implemented, the POS store controller 31 will behave as if the data originated from an ordinary POS terminal 32. As a result, self-checkout stations 40 in accordance with the illustrated embodiments may be integrated into existing store POS systems without requiring reprogramming of any pre-existing POS store controllers 31.

After the POS store controller 31 receives the data, the POS store controller 31 will reply by sending a price for the item to the SCS 40 via the POS interface 48. In step S93, the SCS 40 inputs this price. Then, in step S94, the controller 41 checks to determine whether there are any more data records in the local item list. If there are more data records, processing returns to step S92 where the next data record on the list is sent out to the POS store controller 31 via the POS interface 48. If, in step S94, it is determined that there are no more data records on the list, processing continues at step S95.

In an alternative embodiment (not shown), instead of loading all the data records in the item list from the PT 50 into the SCS 40 in one batch, and subsequently transferring each data record from the item list to the POS store controller 31 one at a time and waiting for responses from the POS store controller 31, the inputting of the data records and the communication with the POS store controller 31 may be interspersed with one another. More specifically, the SCS 40 may input one data record from the PT 50, transfer data for that one data record to the POS store controller 31, wait for the price for that one item to arrive from the POS store controller 31, and then repeat the input/transfer/get-price process for each of the remaining data records in the PT's item list 53C in turn. In this alternative embodiment, there is no need to maintain a local copy of the PT's item list 53C at the SCS 40.

In step S95, the SCS 40 calculates the total price for all the items in the item list. This calculation may be accomplished locally in the SCS 40 using the item list received from the PT 50 and the prices received from the POS store controller 31. Alternatively, the POS store controller 31 may compute the total price for the order in a conventional manner and transfer it to the SCS controller 41 via the POS interface 48.

In step S96, the SCS 40 requests payment from the customer by, for example, displaying the total price together with an appropriate message on the display 47. In response to this message, the customer tenders payment by placing currency in the cash acceptor 45 or by swiping a credit or debit card in the card processor 46. The cash accepting system 45 and the credit/debit card processor 46 may be implemented using any of a variety of techniques well known to those skilled in the art, as described above.

In step S97, the controller 41 waits for an indication that sufficient payment has been received. This payment-received indication could be, for example, a report from the cash acceptor 45 of an amount of inserted cash, an indication from the cash acceptor 45 that the amount of inserted cash exceeds a threshold provided by the controller 41, or an indication from the card processor 46 that a credit/debit card transaction has been approved. After receiving the payment-received indication, the controller 41 instructs the display 47 to display an appropriate confirmation message (e.g., "your payment has been accepted—thank you") in step S98. The customer may then exit with their purchase. Preferably, the PTs 50 are eventually returned to the PT base station 35 by a store employee.

Operation of the alternative "dumb terminal" embodiment is similar to the operation of the real-time embodiment described above, with a number of modifications. For example, in the dumb terminal embodiment, when the PT 50 identifies a selected item, the PT immediately reports the results of the identification to the base station 35 using a suitable remote communication protocol. The base station then looks up the prices and maintains the item list. User requests for price information that are initiated at the PT 50 may also be serviced by the base station 30 using a suitable two-way communication link. Preferably, the base station 35 maintains an item list file for each PT 50 in the store. When a PT 50 is eventually placed in the cradle 42 in the SCS 40, the base station 35 transfers the item list file corresponding to that PT to the SCS 40. Preferably the transfer of data from the base station 35 to the SCS 40 is initiated in response to the docking of the PT 50 in the SCS 40.

The above-described embodiments provide a number of advantages. For example, by combining portable customer-operated barcode reading with a cashier-less payment system, the time wasted by customers waiting in checkout queues may be eliminated or reduced. More specifically, if a sufficient number of self-checkout stations are provided in a store, a customer who has finished selecting items will always be able to find a self-checkout station that is not being used by another customer. As a result, a customer will never have to wait in line behind another customer that is experiencing a checkout problem.

Another advantage provided by the above-described embodiments is that the PTs may be returned at the checkout stations, and need not be returned to the same rack from which they were obtained (in contrast to the Scanboy™ system). This arrangement saves the customer the trouble of walking to a part of the store that may be far from the spot where the customer has finished selecting items, and allows the customer to proceed directly to a checkout station. Because the checkout station may be located more than 20 feet from the rack (or even more than 100 feet away, in larger stores), this feature can save a significant amount of walking. These and other advantages will be apparent to persons skilled in the relevant art.

While the present invention has been explained in the context of the preferred embodiments described above, it is to be understood that various changes may be made to those embodiments, and various equivalents may be substituted, without departing from the spirit or scope of the invention, as will be apparent to persons skilled in the relevant arts.

What is claimed is:

1. A customer-operated self-checkout system for items bearing identifiers, the system comprising:
    a portable terminal including a data reader and a first RF interface, wherein the portable terminal identifies selected items using the data reader, and transmits information about the selected items via the first RF interface;
    a base station including a second RF interface, a memory, and a data output port, wherein the base station receives the information about the selected items from the portable terminal via the second RF interface, stores the information in the memory, and outputs the information via the data output port; and
    a self-checkout station including a data input port, a customer-operated automated payment-accepting subsystem, and a portable terminal interface at the customer-operated automated payment-accepting subsystem for communicating directly with the terminal to identify the portable terminal, wherein the self-checkout station receives the stored information from the base station data output port via the data input port, and accepts payment from the customer for the selected items using the payment-accepting subsystem.

2. The system of claim 1, wherein the data reader identifies the selected items by reading barcodes, and the data reader comprises a barcode reader selected from a group consisting of: a flying spot scanner, an optical imagining reader, and a wand reader.

3. The system of claim 1, wherein the data reader identifies the selected items by reading optical characters, and the data reader comprises an optical character recognition reader.

4. The system of claim 1, wherein the data reader identifies the selected items by reading radio frequency identification tags, and the data reader comprises a radio frequency identification tag reader.

5. The system of claim 1, wherein the base station memory stores a price look-up table, and wherein a total price for selected items is computed based on a price look-up table.

6. The system of claim 1, wherein the self-checkout station further includes an interface to a point-of-sale system.

7. The system of claim 1, wherein the payment-accepting subsystem comprises at least one of a credit card transaction device, a debit card transaction device, and a cash-accepting device.

8. The system of claim 1, wherein the portable terminal further includes terminal identification information.

\* \* \* \* \*